Dec. 21, 1954 M. C. VOSBURGH 2,697,787

ALTERNATING CURRENT BRIDGE CIRCUITS

Filed Oct. 30, 1951

INVENTOR
MALCOLM C. VOSBURGH
BY Elmer J. Gorn
ATTORNEY

United States Patent Office 2,697,787

Patented Dec. 21, 1954

2,697,787

ALTERNATING CURRENT BRIDGE CIRCUITS

Malcolm C. Vosburgh, Newton, Mass., assignor to Raytheon Manufacturing Company, Newton, Mass., a corporation of Delaware Application October 30, 1951, Serial No. 253,841

9 Claims. (Cl. 250—36)

This invention relates to bridge circuits comprising temperature sensitive resistance devices giving an alternating current proportional to the unbalance and with a phase indicating the direction of the unbalance.

Such bridge circuits have been found useful in controlling the frequency of an oscillator. For this purpose, it has been customary to use rectifiers in bridge circuits to derive a direct current potential proportional to the frequency deviation. If this voltage is not sufficient to effect the desired frequency correction, or give the desired indication, it is necessary to use a direct current amplifier. Such amplifiers have inherent drifts and are very sensitive to variations in supply voltage. It is difficult to obtain the desired uniformity and constancy of detector conversion efficiencies with such an amplifier.

If temperature sensitive resistance devices, such as barretters, bolometers, and thermistors, are used instead of rectifiers in a bridge supplied with alternating current, an alternating current amplifier may be used instead of a direct current amplifier with greater reliability. The output of the amplifier can then be compared in phase with the supply voltage to determine the direction of frequency deviation.

By the present invention the temperature sensitive resistors in such a bridge are heated by radio frequency energy from the source to be controlled, one through a circuit resonant at a frequency higher than the desired frequency, and the other through a circuit resonant at a frequency lower than the desired frequency. When the controlled oscillator output is of the desired frequency, both bolometers are heated equally and there is no output. When the oscillator is off frequency, the bolometers are heated unequally as one is receiving more energy than the other, the one receiving its energy through the circuit tuned closest to the emitted frequency receiving the greatest power. The output of the bridge is an alternating current of an amplitude having a functional relation to the frequency deviation and with a phase indicative of the direction of unbalance. This output is fed into a phase detector to derive a direct current proportional to the deviation and having a polarity indication of the direction of the deviation. This current is used to correct the operating frequency of the oscillator. This is done in one embodiment by using the output of the phase detector in a reactance modulator associated with the frequency determining circuit of the oscillator. In another embodiment the alternating current output of the bridge is used to feed one portion of the split field of a motor while the bridge supply current shifted 90 degrees in phase is used to feed the other section of the motor to drive the motor in a direction determined by the frequency deviation as represented by the phase of the bridge output to turn a tuning control on the oscillator to correct its output frequency.

Other and further advantages of this invention will be apparent as the description thereof progresses, reference being had to the accompanying drawings, wherein.

Figure 1:
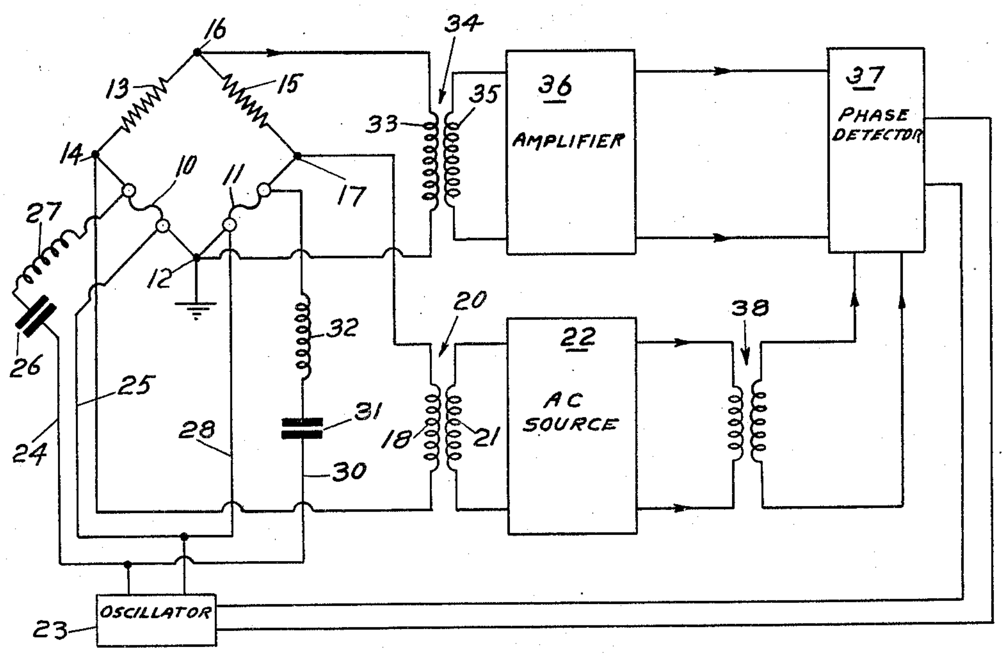
Fig. 1 is a schematic diagram of a circuit utilizing the principle of the invention.

In Fig. 1, the numerals 10 and 11 refer to two temperature sensitive resistors, such as bolometers, that are heated by radio frequency energy, one by such energy above the desired frequency, and the other by such energy at a frequency below the desired frequency by a means to be described later. The two bolometers are connected together and to ground at a point 12. The bolometer 10 is connected to a resistor 13 of known and stable value at a point 14. The resistor 13 is connected to a second such resistor 15 at a point 16. The other terminal of the resistor 15 is connected to the other terminal of the bolometer 11 at a point 17. The secondary winding 18 of a supply transformer 20 is connected across the points 14 and 17. The primary winding 21 of this transformer 20 is connected to a source of alternating current 22. A portion of the output of an oscillator 23 to be controlled is coupled to the bolometer 10 over wires 24 and 25 through a series resonant circuit comprising capacitor 26 and inductance 27 resonant at a frequency higher than the desired operating frequency of the oscillator 23. Another portion of the output of the oscillator 23 is coupled to the bolometer 11 over wires 28 and 30 through a series resonant circuit comprising capacitor 31 and inductance 32 resonant at a frequency lower than the desired operating frequency of the oscillator 23. The primary winding 33 of an output transformer 34 is connected across the terminals 12 and 16 of the bridge circuit. The secondary winding 35 of the output transformer 34 is connected to an amplifier 36, the output of which is connected to a phase detector 37.

Figures 2, 3, 4:
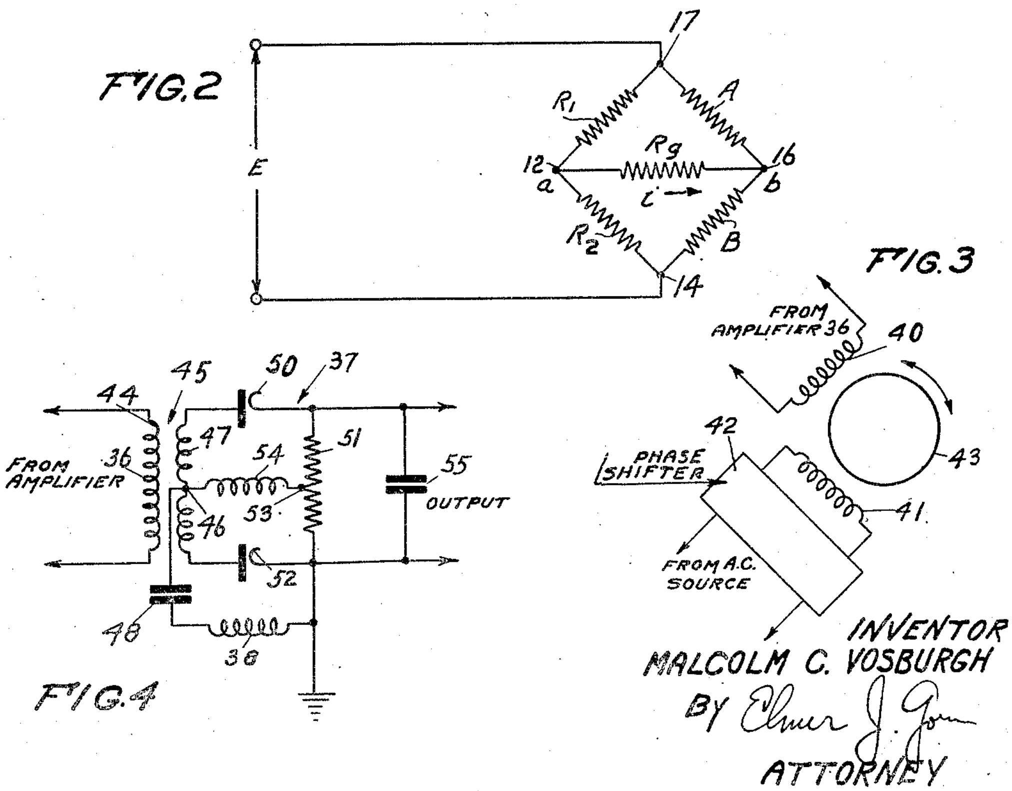
Fig. 2 is an equivalent circuit diagram for the bridge shown in Fig. 1.
Fig. 3 is a device for representing the output of the circuit of Fig. 1 as a mechanical displacement.
Fig. 4 is one form of phase detector used in the circuit of Fig. 1.

The phase detector 37 is also supplied with alternating current from the source 22 through transformer 38. The output of the phase detector may be either a mechanical displacement proportional in amplitude to the frequency deviation and in a direction determined by the direction of the frequency deviation, in which case a device such as that shown in Fig. 3 is used. The output of the phase detector 37 may also be a voltage proportional in amplitude to the frequency deviation and in a direction determined by the direction of the frequency deviation, or the phase of the output of the bridge circuit, in which case the circuit shown in Fig. 4 is used. The output of the phase detector 37 is applied to the oscillator 23 to correct its output frequency.

The operation of the bridge circuit is best understood by reference to the equivalent circuit diagram of Fig. 2. In this circuit diagram, E is the input voltage from the source 22 of Fig. 1 applied at the terminals 14 and 17 of the bridge. A and B are the resistances of the resistors 13 and 15, respectively. $R_1$ and $R_2$ are the resistances of the bolometers 10 and 11, respectively. The points $a$ and $b$ represent terminals 12 and 16. $R_g$ is the equivalent resistance of the output circuit connected across these terminals 12 and 16. The current through this resistance $R_g$ is $i$ and the voltage across it $e$.

The impedance across the points $a$ and $b$ is:

$$Z_{12}=\frac{AB}{A+B}+\frac{R_1R_2}{R_1+R_2}$$

The voltage across the points $a$ and $b$ is:

$$E_{12}=E\left(\frac{A}{A+B}-\frac{R_1}{R_1+R_2}\right)$$

By Thevenin's Theorem:

$$i=\frac{E_{12}}{R_g+Z_{12}}$$

and $$e=iR_g$$

therefore, $$e=\frac{ER_g\left(\frac{A}{A+B}-\frac{R_1}{R_1+R_2}\right)}{R_g+\frac{AB}{A+B}+\frac{R_1R_2}{R_1+R_2}} \qquad (1)$$

However, for convenience in design, the resistances A and B are made equal, and equal to the initial resistance $R_0$ of the bolometers 10 and 11. With a particular set of conditions:

$$R_1=R_0+d_1$$

$$R_2 = R_0 + d_2$$

Substituting in Equation 1

$$e = \frac{ER_g\left(\frac{1}{2} - \frac{R_0 + d_1}{2R_0 + d_1 + d_2}\right)}{R_g + \frac{R_0}{Z} + \frac{(R_0 + d_1)(R_0 + d_2)}{2R_0 + d_1 + d_2}}$$

$$= \frac{ER_g\left(R_0 + \frac{d_1}{2} + \frac{d_2}{2} - R_0 - d_1\right)}{2R_0R_g + R_g(d_1 + d_2) + 2R_0^2 + \frac{R_0}{2}(d_1 + d_2) + R_0(d_1 + d_2) + d_1d_2}$$

$$= \frac{ER_g\frac{1}{2}(d_2 - d_1)}{2R_0^2 - 2R_0R_g + \left(R_g + \frac{3R_0}{2}\right)(d_1 + d_2) + d_1d_2} \quad (2)$$

If $d_1$ and $d_2$ are small, $$d_1d_2 << 2R_0(R_0 + R_g)$$

and $$\left(R_g - \frac{3R_0}{2}\right)(d_1 + d_2) < 2R_0(R_0 + R_g)$$

so that ignoring the smaller quantities $$e = \frac{ER_g(d_2 + d_1)}{4R_0(R_0 + R_g)} \quad (3)$$

It will be seen from (3) that when $d_2$ is positive and larger than $d_1$, which is also positive, $e$ will be positive, but when $d_2$ is negative, or $d_1$ larger than $d_2$, $e$ will be negative although E is positive. Since both E and $e$ are alternating voltages, this relationship can be expressed by saying $e$ and E are either in phase, or 180 degrees out of phase, depending upon the relative amounts of changes in the resistance of the bolometers. When this voltage $e$ is applied to the phase detector 27 and compared with the phase of the voltage from the source 22, the output will depend upon whether the voltage $e$ is in phase, or 180 degrees out of phase with the input voltage E. The resulting signal then can be used to correct the deviating frequency.

This phase comparison is accomplished by the circuit shown in Fig. 3. In this circuit, the output of the amplifier 36 is connected across one field winding 40 of a two-phase motor. The second winding phase 41 of this motor is connected across the secondary of the transformer 38 through a 90 degrees phase-shifting network 42. The result is that the voltage output of the bridge is either 90 degrees or 270 degrees out of phase with the reference voltage from the source 22. When the phase difference is 90 degrees, the armature 43 is turned in one direction, and when the difference is 270 degrees, the armature is turned in the opposite direction. The armature shaft operates a tuning control in the oscillator 23 in such a direction as to shift the frequency of the output of the oscillator back to the desired frequency.

Where a reactance tube is used to shift the frequency of the oscillator 23, the circuit of Fig. 4 is used to obtain a voltage proportional to the deviation and with a polarity determined by the direction of the deviation. In this circuit, the primary 44 of a transformer 45 is connected across the output terminals of the amplifier 36. The center tap 46 of the secondary 47 of the transformer 45 is coupled to the secondary of the transformer 38 through a capacitor 48. One end of the secondary winding is connected through a diode 50 to one end of a resistor 51. The other end of the secondary 47 is connected through a second diode 52 to the other end of the resistor 51. The center tap 46 of the secondary 47 is connected to a center tap 53 of the resistor 51 through a choke 54. A capacitor 55 is connected across the resistor 51. The output voltage appears across the resistor 51.

In operation, this circuit is similar to the Foster-Seeley discriminator circuit commonly used as a second detector in frequency modulation receivers. It differs from such a circuit in that the reference frequency is applied to the center tap 46 of the secondary winding 47 rather than applying the input signal at this point, as is the case in the Foster-Seeley discriminator circuit. In the circuit of Fig. 4, there need be no provision for tuning either the primary or the secondary of the transformer 45 as is done in the Foster-Seeley circuit. When the two voltages to be compared are in phase, the output is positive, and when they are 180 degrees out of phase, the output is negative. The output of the phase sensitive device 37 is a function of the output of the bridge circuit.

The principle of the invention is adapted to use with a microwave receiver by splitting the incoming energy into two cavities, one of which is designed to be resonant at a frequency higher than the desired frequency, and the other cavity designed to be resonant at a frequency lower than the desired frequency. A bolometer is placed in each of these cavities and connected in the bridge circuit of this invention. Thus when the frequency of the incoming energy is higher than the desired frequency, the bolometer in the cavity resonant at the higher frequency will be heated to a higher temperature than the bolometer in the cavity resonant at the lower frequency. When the frequency of the incoming energy is lower than desired, the situation is reversed and the bolometer in the low frequency cavity heats to a higher temperature. As explained above, this unequal heating of the bolometers in the bridge circuit produces either an angular displacement, or a voltage that may be used to correct for this frequency deviation.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An alternating current bridge circuit comprising a pair of non-linear resistors connected in a bridge circuit with a pair of stable resistors, means for applying an alternating current to the bridge to obtain an alternating voltage proportional to the unbalance and having a phase indicative of the direction of the unbalance, phase sensitive means to produce an angular displacement output proportional to the unbalance and in a direction determined by the direction of unbalance comprising a two phase motor having a two section field winding with means for applying alternating current from the bridge supply source to one section of the field, and means for applying the output of the bridge to the other section of the field.

2. An alternating current bridge circuit comprising a pair of non-linear resistors connected in a bridge circuit with a pair of stable resistors, means for applying an alternating current to the bridge to obtain an alternating voltage proportional to the unbalance and having a phase indicative of the direction of the unbalance, phase sensitive means to produce an output voltage proportional to the unbalance and in a direction determined by the direction of unbalance comprising rectifying means, and means to insert in the rectifying means the output of the bridge and alternating current from the bridge supply source 90 degrees out of phase with each other.

3. An alternating current bridge circuit comprising a pair of temperature responsive resistors, one connected in each of two arms of the bridge, a pair of stable resistors, one connected in each of two other arms of the bridge, means for applying an alternating current voltage across one pair of diagonal corners of the bridge, means for obtaining a voltage proportional to the unbalance and having a phase indicative of the direction of the unbalance, phase sensitive means to produce an angular displacement output proportional to the unbalance and in a direction determined by the direction of unbalance comprising a two phase motor having a two section field with means for applying alternating current from the bridge supply source to one section of the field, and means for applying the output of the bridge to the other section of the field 90 degrees out of phase with each other.

4. An alternating current bridge circuit comprising a pair of temperature responsive resistors, one connected in each of two arms of the bridge, a pair of stable resistors, one connected in each of two other arms of the bridge, means for applying an alternating current voltage across one pair of diagonal corners of the bridge, means for obtaining a voltage proportional to the unbalance and having a phase indicative of the direction of the unbalance, phase sensitive means to produce an output voltage proportional to the unbalance and in a direction determined by the direction of unbalance comprising rectifying means, and means to insert in the rectifying means the output of the bridge and alternating current from the bridge supply source 90 degrees out of phase with each other.

5. In a frequency control circuit a bridge circuit comprising a pair of non-linear resistors connected in a bridge circuit with a pair of stable resistors, means for delivering maximum heat to one of said non-linear resistors when the frequency to be controlled is above the desired frequency and to the other of said non-linear resistors when the frequency to be controlled is below the desired frequency, means for applying an alternating current to the bridge circuit to obtain an alternating voltage proportional to the frequency deviation and having a phase indicative of the direction of the deviation, phase responsive means to produce an output proportional to the frequency deviation and in a direction determined by the direction of deviation comprising a two phase motor having a two section field with means for applying alternating current from the bridge supply source to one section of the field, and means for applying the output of the bridge to the other section of the field 90 degrees out of phase with each other.

6. In a frequency control circuit a bridge circuit comprising a pair of non-linear resistors connected in a bridge circuit with a pair of stable resistors, means for delivering maximum heat to one of said non-linear resistors when the frequency to be controlled is above the desired frequency and to the other of said non-linear resistors when the frequency to be controlled is below the desired frequency, means for applying an alternating current to the bridge circuit to obtain an alternating voltage proportional to the frequency deviation and having a phase indicative of the direction of the deviation, and phase responsive means to produce an output proportional to the frequency deviation and in a direction determined by the direction of deviation, comprising rectifying means, and means to insert in the rectifying means the output of the bridge and alternating current from the bridge supply source 90 degrees out of phase with each other.

7. In a frequency control circuit a bridge circuit comprising a pair of temperature responsive resistors, one connected in each of two arms of the bridge circuit, a pair of resistors, one connected in each of the other two arms of the bridge, means for delivering maximum heat to one of said non-linear resistors when the frequency to be controlled is above the desired frequency and to the other of said non-linear resistors when the frequency to be controlled is below the desired frequency, means for applying an alternating current across one pair of diagonal corners of the bridge circuit to obtain an alternating voltage proportional to the frequency deviation and having a phase indicative of the direction of the deviation, phase responsive means to produce an output proportional to the frequency deviation and in a direction determined by the direction of deviation comprising a two phase motor having a two section field with means for applying alternating current from the bridge supply source to one section of the field, and means for applying the output of the bridge to the other section of the field 90 degrees out of phase with each other.

8. In a frequency control circuit a bridge circuit comprising a pair of temperature responsive resistors, one connected in each of two arms of the bridge circuit, a pair of resistors, one connected in each of the other two arms of the bridge, means for delivering maximum heat to one of said non-linear resistors when the frequency to be controlled is above the desired frequency and to the other of said non-linear resistors when the frequency to be controlled is below the desired frequency, means for applying an alternating current across one pair of diagonal corners of the bridge circuit to obtain an alternating voltage proportional to the frequency deviation and having a phase indicative of the direction of the deviation, phase responsive means to produce an output proportional to the frequency deviation and in a direction determined by the direction of deviation comprising rectifying means, and means to insert in the rectifying means the output of the bridge and alternating current from the bridge supply source 90 degrees out of phase with each other.

9. In a frequency control circuit a bridge circuit comprising a pair of non-linear resistors connected in a bridge circuit with a pair of stable resistors, means to deliver energy from the source to be controlled to one non-linear resistor through means having minimum impedance at a frequency above the desired frequency, means to deliver energy from the source to be controlled to the other non-linear resistor through means having minimum impedance at a frequency below the desired frequency, and means for applying an alternating current to the bridge circuit to obtain an alternating voltage proportional to the frequency deviation and having a phase indicative of the direction of the deviation.

References Cited in the file of this patent

UNITED STATES PATENTS

| Number | Name | Date |
|---|---|---|
| 1,590,420 | Chubb | June 29, 1926 |
| 2,232,390 | Katzin | Feb. 18, 1941 |
| 2,243,202 | Fritz | May 27, 1941 |
| 2,431,501 | Phillips | Nov. 25, 1947 |
| 2,457,997 | George | Jan. 4, 1949 |
| 2,498,103 | Wojciechowski | Feb. 21, 1950 |